(12) United States Patent
Dron et al.

(10) Patent No.: US 6,365,216 B1
(45) Date of Patent: Apr. 2, 2002

(54) PARTICLES OF N-[N-(3,3-DIMETHYLBUTYL)-L-α-ASPARTYL]-L-PHENYLALANINE 1-METHYL ESTER

(75) Inventors: Aditi Dron, Streamwood; Ihab E. Bishay, Mundelein; Jim Fotos, Wheeling; Michael J. Trione, Mundelein, all of IL (US)

(73) Assignee: The NutraSweet Company, Chicago, IL (US)

( * ) Notice: Subject to any disclaimer, the term of this patent is extended or adjusted under 35 U.S.C. 154(b) by 0 days.

(21) Appl. No.: 09/534,067

(22) Filed: Mar. 24, 2000

Related U.S. Application Data
(60) Provisional application No. 60/126,363, filed on Mar. 26, 1999.

(51) Int. Cl.⁷ .............................................. A23L 1/236
(52) U.S. Cl. .......................... 426/548; 426/89; 426/96; 426/516; 560/40
(58) Field of Search .......................... 426/548, 89, 96, 426/103, 516; 560/40, 41

(56) References Cited

U.S. PATENT DOCUMENTS

| | | | |
|---|---|---|---|
| 5,480,668 A | 1/1996 | Nofre et al. | 426/548 |
| 5,510,508 A | 4/1996 | Claude et al. | 560/41 |
| 5,728,862 A | 3/1998 | Prakash | 560/40 |

FOREIGN PATENT DOCUMENTS

| | | |
|---|---|---|
| EP | 0 229 730 | 7/1987 |
| WO | 89/00819 | 2/1989 |
| WO | 93/07859 | 4/1993 |
| WO | 95/22319 | 8/1995 |
| WO | 99/12954 | 3/1999 |
| WO | 99/12955 | 3/1999 |
| WO | 99/12956 | 3/1999 |
| WO | 99/12957 | 3/1999 |
| WO | 99/62354 | 12/1999 |
| WO | 00/15049 | 3/2000 |
| WO | 00/31118 | 6/2000 |

OTHER PUBLICATIONS

W. Pietsch, "Size Enlargement by Agglomeration", John Wiley & Sons, pp. 383–385 (1991).

Patent Abstracts of Japan, vol. 007, No. 277 (C–199), Dec. 9, 1983 (corresponds to JP 58–155054).

Patent Abstracts of Japan, vol. 006, No. 257 (C–140), Dec. 16, 1982 (corresponds to JP 57–150361).

*Primary Examiner*—Leslie Wong
(74) *Attorney, Agent, or Firm*—Fitzpatrick, Cella, Harper & Scinto; Jeffrey M Hoster

(57) ABSTRACT

N-[N-(3,3-dimethylbutyl)-L-α-aspartyl]-L-phenylalanine 1-methyl ester is converted from a light powder to relatively dustless, free-flowing particles with and without the use of binders using extrusion and spheronization processes. These particles are suitable for use in a variety of applications. Food products sweetened with extruded or spheronized N-[N-(3,3-dimethylbutyl)-L-α-aspartyl]-L-phenylalanine 1-methyl ester and methods of sweetening food products with such N-[N-(3,3-dimethylbutyl)-L-α-aspartyl]-L-phenylalanine 1-methyl ester are also disclosed.

90 Claims, No Drawings

PARTICLES OF N-[N-(3,3-DIMETHYLBUTYL)-L-α-ASPARTYL]-L-PHENYLALANINE 1-METHYL ESTER

This application claims the benefit of U.S. Provisional Patent Application No. 60/126,363, filed Mar. 26, 1999.

BACKGROUND OF THE INVENTION

1. Field of the Invention

This invention relates to the formation of particles of N-[N-(3,3-dimethylbutyl)-L-α-aspartyl]-L-phenylalanine 1-methyl ester (neotame) by, for example, extrusion and/or spheronization with and without binders. Neotame is converted from a light powder to dustless, free-flowing particles suitable for use in a variety of applications. This invention also relates to food products sweetened with the neotame particles, as well as to methods of preparing such food products.

2. Related Background Art

It is known that N-[N-(3,3-dimethylbutyl)-L-α-aspartyl]-phenylalanine 1-methyl ester (neotame) is an extremely potent sweetening agent (about 8000X sweeter than sugar) that has the formula

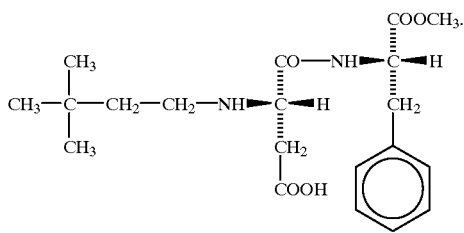

Clearly, the use of a high potency sweetener such as N-[N-(3,3-dimethylbutyl)-L-α-aspartyl]-L-phenylalanine 1-methyl ester requires consideration of the ability to deliver the sweetener in a given application. Thus, effective means for delivering neotame in desired compositions are very useful.

Extrusion is a well known technique used in a number of industries for a variety of purposes. For example, food compositions are routinely extruded in order to obtain desired shapes and forms; similarly, other materials such as agricultural compositions and plastics are extruded. In addition, extrusion apparatuses can be used as delivery means for a wide range of products.

Spheronization is a well known technique used in the pharmaceutical industry to provide rounded particles that can be uniformly coated. For example, WO 95/22319 discloses a process for preparing fine particle pharmaceutical formulations by combining dry components with an extrusion aid (typically a pharmaceutically acceptable oil or wax), wetting the mixture, extruding and then spheronizing. This procedure results in fine particle formulations which exhibit improved uniformity of particle size and performance characteristics such as drug release.

WO 93/07859 generally discloses a method of preparation for pharmaceutical pellets comprising melt spheronization, i.e., extrusion under temperatures appropriate to melt the active pharmaceutical agent and necessary excipients and subsequent spheronization.

Spheronization has also been employed in the sweetener industry. WO 89/00819 discloses self-stabilized compositions of dipeptide sweeteners and their salts and complexes, which exhibit heat stability and a sustained release mechanism that insures uniform dissolution and dispersion within baked products. The compositions are produced by spheronizing a dipeptide sweetener, aspartame in particular, with or without a suitable binding agent to produce dense, non-porous spherical granules of narrow particle size distribution. The compositions may be coated with a hydrophobic coating.

Particles of N-[N-(3,3-dimethylbutyl)-L-α-aspartyl]-L-phenylalanine 1-methyl ester formed by either extrusion or spheronization are not disclosed or suggested by the aforementioned art.

SUMMARY OF THE INVENTION

The present invention is directed to a process for forming particles of N-[N-(3,3-dimethylbutyl)-L-α-aspartyl]-L-phenylalanine 1-methyl ester. This process comprises the steps of (a) mixing N-[N-(3,3-dimethylbutyl)-L-α-aspartyl]-L-phenylalanine 1-methyl ester and a plasticizer to form a wet mass; (b) extruding said wet mass to form extrudates; and (c) drying said extrudates to form said particles of N-[N-(3,3-dimethylbutyl)-L-α-aspartyl]-L-phenylalanine 1-methyl ester. In a preferred embodiment of the present invention, water is used as the plasticizer.

In certain preferred embodiments of the present invention, a binder is incorporated in the wet mass prior to the extruding step. In other preferred embodiments, the wet mass is heated prior to the extruding step.

In further preferred embodiments of the present invention, spheres are formed from the extrudates prior to drying.

This invention is further directed to extruded or spheronized particles of N-[N-(3,3-dimethylbutyl)-L-α-aspartyl]-L-phenylalanine 1-methyl ester made according to the processes of the present invention.

Additional embodiments of the present invention are directed to food products sweetened with such particles of neotame and to methods of sweetening food products with the particles of neotame of this invention such as extruded neotame, spheronized neotame or the like.

DETAILED DESCRIPTION

N-[N-(3,3-dimethylbutyl)-L-α-aspartyl]-L-phenylalanine 1-methyl ester (neotame) is a high potency dipeptide sweetener (about 8000X sweeter than sucrose) that has the formula

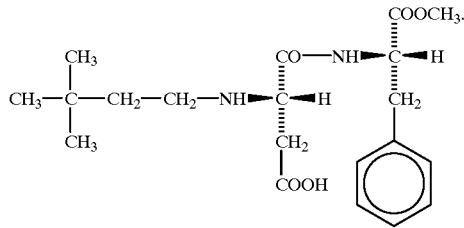

The chemical synthesis of neotame is disclosed in U.S. Pat. No. 5,480,668, U.S. Pat. No. 5,510,508 and U.S. Pat. No. 5,728,862, the disclosure of each of which is incorporated by reference herein. Thus, the starting material may be readily prepared by one of ordinary skill without undue experimentation.

Generally, N-[N-(3,3-dimethylbutyl)-L-α-aspartyl]-L-phenylalanine 1-methyl ester exists as a light, somewhat dusty powder. Extrusion and optional spheronization can be used as particle formation techniques to form relatively dustless, free flowing particles of N-[N-(3,3-dimethylbutyl)-L-α-aspartyl]-L-phenylalanine 1-methyl ester. Such particles can be regarded as "extrudates" or "spheres", depending upon their processing and characteristics.

As used herein, the term "particles" includes, for example, "granules" such as "extrudates", "spheres" and the like, which have been, for example, "granulated", (e.g., "extruded", "spheronized" or the like). Also as used herein, the terms "extrudates" or "extruded neotame" refer to preferably cylindrical, free-flowing, relatively non-dusty, mechanically strong granules of N-[N-(3,3-dimethylbutyl)-L-α-aspartyl]-L-phenylalanine 1-methyl ester. Further, as used herein, the terms "spheres" or "spheronized neotame" refer to relatively spherical, smooth, free-flowing, relatively non-dusty, mechanically strong granules. While spheres typically have a smoother surface and may be stronger/harder than extrudates, extrudates offer a cost advantage in that less processing is required. The spheres and extrudates of this invention may be further processed, if desired, to form various other particles, such as, for example, by grinding or chopping.

Any form of neotame may be used in the extrudates and spheres of this invention. For example, salts and metal complexes of neotame may be used, such as disclosed in U.S. Pat. No. 6,291,004, U.S. Pat. No. 6,180,156, U.S. Pat. No. 6,129,942, and U.S. Pat. No. 6,146,680, all filed Sep. 4, 1998, and all of which are incorporated by reference herein. The anhydrous form of neotame is suitable for use in this invention, as well as the various crystalline forms of neotame. Other exemplary forms of neotame that may be useful in this invention include cyclodextrin/neotame complexes such as disclosed in U.S. Provisional Patent Application No. 60/100,867 and co-crystallized neotame disclosed in U.S. Pat. No. 6,214,402, both filed Sep. 17, 1998, and the disclosure of both of which are incorporated by reference herein.

One embodiment of the present invention is directed to a process by which particles of N-[N-(3,3-dimethylbutyl)-L-α-aspartyl]-L-phenylalanine 1-methyl ester are formed with the use of a binder.

In the first step of this process, N-[N-(3,3-dimethylbutyl)-L-α-aspartyl]-L-phenylalanine 1-methyl ester, a plasticizer and a binder are mixed to form a wet mass.

Suitable plasticizers include, without limitation, water, glycerol and mixtures thereof. Water is a particularly preferred plasticizer.

Suitable binders include, without limitation, polyvinylpyrrolidone (PVP), maltodextrins, microcrystalline cellulose, starches, hydroxypropylmethyl cellulose (HPMC), methylcellulose, hydroxypropyl cellulose (HPC), gum arabic, gelatin, xanthan gum and mixtures thereof. The binder is generally present in the wet mass in an amount of about 0.01–45% by weight, and preferably from 0.5–10% by weight.

Binder can optionally be dissolved in the plasticizer to form a binder solution. The binder solution can then be added to the neotame and other dry ingredients if present. In this way, the binder will be better distributed throughout the wet mass. If this is done using an extruder that has mixing capability (e.g., Extrud-O-Mix by Hosokawa Bepex), then the binder solution could be continuously added and mixed into the dry ingredients. This would help to eliminate the mixing/kneading step and also the need for mixing/kneading equipment.

N-[N-(3,3-dimethylbutyl)-L-α-aspartyl]-L-phenylalanine 1-methyl ester is generally present in the wet mass in an amount of about 0.5–90% by weight, and preferably from about 1–80% by weight.

The plasticizer is generally present in the wet mass in an amount of 4–45% by weight, and preferably from 15–35% by weight.

Optionally included in the wet mass are carriers and additives. Any typical food ingredient may be incorporated in the wet mass as a carrier or as an additive; one of ordinary skill in this art would readily appreciate the scope of appropriate food ingredients, as well as the acceptable amount of a given food ingredient to incorporate in the wet mass. In preferred embodiments of the present invention, lactose, maltodextrins, dextrose, citric acid, microcrystalline cellulose, sugar, sugar alcohols and mixtures thereof are included in the wet mass as a carrier. In additional preferred embodiments, $CaCl_2$, $MgCl_2$, flavor enhancers/modifiers, acidulants and mixtures thereof are included in the wet mass as additives. Appropriate amounts, as readily determined by one of ordinary skill in the art, of such carriers and additives can be included in the wet mass in order to achieve a desired effect on taste or functionality.

In the second step of the process of the present invention, the wet mass is extruded to form extrudates. Extrusion can be accomplished by any known means, including a low pressure extruder fitted with a die. One skilled in the art can readily choose an appropriate die size in order to obtain the desired final particle size. The wet extrudates can be further cut into uniform length pellets using a cutting device attached to the discharge end of the extruder.

The extrudates are preferably cylindrical in shape and usually take the form of noodles or pellets. The shape and size of the extrudates may vary depending upon the shape and size of the die openings and the use of a cutting device.

In the final step of this embodiment of the present invention, the extrudates are dried. Drying is generally accomplished using a fluidized bed dryer, though any suitable drying method may be employed.

In a preferred embodiment of this process, the extrudates are formed into spheres prior to drying, typically by charging into a marumerizer. As described in Size Enlargement by Agglomeration by Wolfgang Pietsch, pp. 383–385, John Wiley & Sons (1991), a marumerizer consists of a vertical hollow cylinder (bowl) with a horizontal rotating disc (friction plate) therein. The noodle-like extrudates are charged onto the friction plate and almost immediately break into short segments of uniform length. The rotating disc surface can have a variety of textures suited for specific purposes. Typically a grid is applied, the pattern of which corresponds to the desired particle size. The plastic extrudate segments are formed into spheres by contact with the rotating disc as well as by collisions with the wall and between particles. During deformation into spheres and densification, excess moisture may move to the surface or thixotropic behavior may be exhibited by the mass. When this happens, slight dusting with a suitable powder dispenser reduces the probability that particles will stick together.

A second embodiment of the present invention is directed to a process by which particles of N-[N-(3,3-dimethylbutyl)-L-α-aspartyl]-L-phenylalanine 1-methyl ester are formed without the use of a binder. Without being bound to theory, this is possible because N-[N-(3,3-dimethylbutyl)-L-α-aspartyl]-L-phenylalanine 1-methyl ester, unlike other known high potency sweeteners, exhibits unique binding properties at the temperatures of the present process. This may be due, in part, to neotame's low melting point (82° C.). The formation of particles without having to use a binder is desirable as it lowers costs and increases product quality. In this way, it is possible to make particles which do not contain any additives. Further, because it is also possible to make compositions having very high neotame concentrations, flexibility in delivering neotame for targeted uses is provided.

In the first step of this embodiment of the present invention, N-[N-(3,3-dimethylbutyl)-L-α-aspartyl]-L-phenylalanine 1-methyl ester and a plasticizer are mixed to form a wet mass. This can be done in a kneader/continuous mixer.

Suitable plasticizers include, without limitation, water, glycerol and mixtures thereof. Water is a particularly preferred plasticizer.

N-[N-(3,3-dimethylbutyl)-L-α-aspartyl]-L-phenylalanine 1-methyl ester is generally present in the wet mass in an amount of 65–85% by weight.

The plasticizer is generally present in the wet mass in an amount of 15–35% by weight.

In the second step, the wet mass is heated to promote the binding of the wet mass. Generally, the wet mass is heated to approximately 30° C. to 65° C., and preferably from 40° C. to 60° C. Such heating may be performed in an oven or in a kneader with heated jacket.

Alternatively, both the above-mentioned steps, i.e., mixing and heating, can be accomplished in an extruder that has mixing capabilities and can provide heating either by high shear or by the use of a heating jacket.

Then, as described above in connection with the first embodiment of the present invention, the wet mass is extruded to form extrudates, and the extrudates or spheres are dried. In a preferred embodiment of this process, spheres are formed from the extrudates prior to drying, typically by charging them into a marumerizer.

Alternatively, the wet mass of the present inventive processes can take the form of neotame wetcake, an intermediate stage in the production of neotame. In this way, it is possible to convert neotame wetcake directly into particles which are non-dusty, free-flowing, value-added forms rather than drying the wetcake into neotame powder and then re-wetting the powder to form the wet mass of the present inventive processes. This processing approach will eliminate one drying step and will reduce the processing cost for the manufacture of neotame particles.

The N-[N-(3,3-dimethylbutyl)-L-α-aspartyl]-L-phenylalanine 1-methyl ester particles (extrudates or spheres) of this invention typically have a particle size ranging from about 10 to about 140 mesh. Preferably, the particles have a particle size ranging from about 20 to about 80 mesh.

In the neotame particles of the present invention which contain a binder, the amount of N-[N-(3,3-dimethylbutyl)-L-α-aspartyl]-L-phenylalanine 1-methyl ester is generally from about 25% to about 99.9% and preferably from about 80% to about 99% and most preferably from about 84% to about 96.7% by weight of the particles. In these same particles, the amount of plasticizer is generally from about 0% to about 15% and preferably from about 3% to about 6% by weight of the particles. The amount of binder present in the final neotame particles is generally from about 0.1% to about 60% and preferably from about 0.1% to about 10% by weight of the particles.

In the neotame particles of the present invention which do not contain a binder, the amount of N-[N-(3,3-dimethylbutyl)-L-α-aspartyl]-L-phenylalanine 1-methyl ester is generally from about 85% to about 100% and preferably from about 94% to about 97% by weight of the particles. In these same particles, the amount of plasticizer is generally from about 0% to about 15% and preferably from about 3% to about 6% by weight of the particles.

The neotame particles of this invention may be coated/encapsulated to increase heat stability, etc. Suitable encapsulants include, without limitation, carbohydrates (e.g., starches, gums, maltodextrins, cyclodextrins), proteins (e.g., zein), fats and waxes, sugars, polymers (e.g., polyvinylacetate, polyethylene), hydroxypropylmethyl cellulose and mixtures thereof.

The extruded or spheronized N-[N-(3,3-dimethylbutyl)-L-α-aspartyl]-L-phenylalanine 1-methyl ester of this invention is suitable for use in any food to supplement or replace natural sweeteners, as well as other high intensity sweeteners, normally used as sweeteners. The term food as used herein includes, for example, beverages, fluid dairy products, non-dairy products, condiments, baked goods, frostings, bakery fillings, candy and chewing gum. The extruded or spheronized N-[N-(3,3-dimethylbutyl)-L-α-aspartyl]-L-phenylalanine 1-methyl ester may also be used in table top sweeteners. In that regard, the disclosures of U.S. Application Ser. Nos. 09/213,263, 09/213,860, 09/215,460, and 09/215,461, directed to the use of neotame in dairy products, baked goods, beverages and table-top applications, respectively, are incorporated by reference herein.

Beverages include, without limitation, carbonated soft drinks, including cola, lemon-lime, root beer, heavy citrus, fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tea-leaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, cultured dairy products such as yogurts and the like. Non-dairy products include, for example, sorbets.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and non-fat to full-fat fillings.

This invention is also directed to a sweetened food composition, such as described above, containing an effective amount of the N-[N-(3,3-dimethylbutyl)-L-α-aspartyl]-L-phenylalanine 1-methyl ester particles of this invention (e.g., extruded or spheronized neotame) to sweeten the food composition. Determination of the amount of neotame particles to be added to the food composition can be readily determined by one of ordinary skill in the art.

The particles of neotame (e.g., extruded or spheronized neotame) of the present invention can be used for this purpose alone or in combination with known bulking agents. Suitable bulking agents include, but are not limited to, dextrose, maltodextrin, lactose, inulin, polyols, polydextrose, cellulose and cellulose derivatives and organic acids including, but not limited to, citric acid and malic acid. Such a product may be suitable for use especially for table-top sweeteners and powdered soft drinks. A table-top sweetener comprising the present particles of neotame (e.g., extruded or spheronized neotame) may also include any other ingredients commonly present in table-top sweeteners in order to tailor the taste of the product to a specific end use. A table-top sweetener comprising the present particles of neotame may take any known form. Suitable forms include, but are not limited to, sachets including the sweetener in powder or granular form, tablets, liquid sweeteners, and jar, pouches, pocket or other forms in which the sweetener may be measured in, for example, spoon for spoon form.

The particles of N-[N-(3,3-dimethylbutyl)-L-α-aspartyl]-L-phenylalanine 1-methyl ester (e.g., extruded or spheronized neotame) of this invention may be used in combination with known natural sweeteners as well as other high intensity sweeteners. Sweeteners that may be employed include, without limitation, aspartame, acesulfame salts (e.g., acesulfame-K), sucralose, saccharin, alitame, cyclamates, stevia derivatives, thaumatin, sucrose (liquid and granulated), high fructose corn syrup, high conversion corn syrup, crystalline fructose, glucose (dextrose), polyol sugar alcohols, invert sugar and mixtures thereof.

Alternatively, any of these known natural sweeteners or other high intensity sweeteners may be combined with neotame, the plasticizer and the optional binder in the present inventive processes to form the wet mass.

The Examples which follow are intended as an illustration of certain preferred embodiments of the invention, and no limitation of the invention is implied.

EXAMPLE 1

Spheronization of N-[N-(3,3-dimethylbutyl)-L-α-aspartyl]-L-phenylalanine 1-methyl Ester without Binder N-[N-(3,3-dimethylbutyl)-L-α-aspartyl]-L-phenylalanine 1-methyl ester (75 wt %) and water (25 wt %) were manually mixed and kneaded. This dough was pre-heated in an oven and extruded at 40° C. using 0.8 mm die. Very good, smooth extrudates were obtained at a high rate. These extrudates were processed in a marumerizer for 30 seconds to form spheres. The spheres were dried in a fluid bed dryer at 50° C. Spherical particles were obtained without any clumps, fines or dust. The spheres did not disintegrate even after shipping. The moisture content of the particles was 5.2% as measured using Karl Fischer titration. The dissolution rate of the particles was: 670 ppm totally dissolved in 20° C. water in 5 minutes. The neotame assay conducted on the particles showed that it survived the process with minimal formation of degradants.

EXAMPLE 2

Spheronization of N-[N-(3,3-dimethylbutyl)-L-α-aspartyl]-L-phenylalanine 1-methyl Ester with Binder N-[N-(3,3-dimethylbutyl)-L-α-aspartyl]-L-phenylalanine 1-methyl ester (80 wt %), water (15 wt %) and polyvinylpyrrolidone (5 wt %) were manually mixed and kneaded. The mixture was extruded using a low pressure extruder with a 0.8 mm die (model DG-L1, LCI). The extrudates were spheronized in a marumerizer (model QJ-400, LCI) for 30 seconds, resulting in good spheres with no clumps. These spheres were dried in a fluid bed dryer at 50° C. The spheres did not disintegrate in the dryer. Even after being shipped, the spheres remained intact, indicating their strength. The moisture content of the spherical particles was 5.1%, as measured using Karl Fischer titration. The dissolution rate of the particles was: 670 ppm totally dissolved in 20° C. water in 1.5 minutes. The neotame assay conducted on the particles showed that it survived the process with minimal formation of degradants.

EXAMPLES 3–7

Examples 3–7 were prepared in a manner substantially similar to Example 2, except the components employed differed as shown in Table 1 below.

TABLE 1

|   | wet mass |
|---|---|
| 1 | 75% neotame |
|   | 25% water |
|   | (heated to 40° C.) |
| 2 | 80% neotame |
|   | 15% water |
|   | 5% PVP |
| 3 | 71.4% neotame |
|   | 14.3% water |
|   | 9.5% M100 |
|   | 4.8% avicel |
| 4 | 33.9% neotame |
|   | 33.9% avicel |
|   | 8.8% PVP |
|   | 23.5% water |
| 5 | 12.3% neotame |
|   | 18.1% CaCl$_2$ |
|   | 41.1% MgCl$_2$ |
|   | 4.8% PVP |
|   | 19.7% avicel |
|   | 4% water |
| 6 | 42.5% neotame |
|   | 42.5% lactose |
|   | 5.2% PVP |
|   | 9.8% water |
| 7 | 22.1% neotame |
|   | 66.2% lactose |
|   | 5.5% PVP |
|   | 6.2% water |

The samples were analyzed for N-[N-(3,3-dimethylbutyl)-L-α-aspartyl]-L-phenylalanine 1-methyl ester and N-[N-3-dimethylbutyl)-L-α-aspartyl]-L-phenylalanine (demethoxylated neotame), a primary degradant, content by high performance liquid chromatography (HPLC). The samples were also tested for hardness, dissolution rate and Karl Fischer moisture. The results are shown in Table 2.

In particular, hardness was tested in the following manner. Approximately 75 g particulate material was screened on an 80 mesh screen. The material was shaken using a Ro-Tap® Testing Sieve Shaker (model B, C. E. Tyler Combustion Engineering Inc.) for ten minutes with a hammer. About 50±1 g of material retained on the screen was transferred to the pan of the screen assembly. Ten 0.5" steel balls were placed in the pan, and clean 80 mesh screen was positioned above the pan. The Ro-Tap® shaker was run for another ten minutes without the hammer. The assembly was removed from the shaker, and the steel balls were removed from the pan. The material was transferred from the pan to the 80 mesh screen. The screen and pan were reassembled and placed in the Ro-Tap®. The shaker was run for another ten minutes with the hammer. The screen assembly was removed, and the material retained on the 80 mesh screen was weighed to the nearest 0.1 g. Hardness was calculated as follows: % hardness=(weight retained on 80 mesh/total weight of sample charged)×100.

The dissolution rate of each sample was measured as a function of absorbance at 258 nm using a spectrophotometer. Sample (0.1 g) was added to 150 g deionized water at 20° C. The water was stirred, and absorbance was measured versus time until it reached its highest value and became constant. The time required to reach the highest level of absorbance has been reported as "dissolution rate".

TABLE 2

Characteristics of Spheronized N-[N-(3,3-dimethylbutyl)-L-α-aspartyl]-L-phenylalanine 1-methyl ester.

| | neotame in finished sample (wt/wt %) | degradant* in finished sample (wt/wt %) | Karl Fischer moisture** | dissolution rate | hardness (%) | comments |
|---|---|---|---|---|---|---|
| 1 | 91.5 | 0.075 | 5.2 | 5 min | 53.4 | spheres |
| 2 | 89.3 | 0.074 | 5.6 | 1.5 min | 93.2 | spheres |
| 3 | 84.4 | 0.083 | 6.1 | insoluble due to avicel content | 86.5 | spheres |
| 4 | 43.8 | 0.051 | 4.1* | insoluble due to avicel content | 86.7 | spheres/rods/fines |
| 5 | 14.4 | 0.019 | 8.9* | insoluble due to avicel content | 95.7 | cylindrical particles with rounded edges |
| 6 | 40.6 | 0.045 | 6.1 | 2.3 min | 93.2 | spheres, some cylindrical particles with rounded edges |
| 7 | 23.8 | 0.032 | 5.7 | 1.0 min | 97.2 | cylindrical particles with rounded edges |

*demethoxylated neotame
**These moisture values were obtained using a Computrac Moisture Analyzer (Arizona Instruments Corp.) with a 100° C. oven temperature, as opposed to using the Karl Fischer method.

EXAMPLE 8

Extrusion of N-[N-(3,3-dimethylbutyl)-L-α-aspartyl]-L-phenylalanine 1-methyl Ester with Binder N-[N-(3,3-dimethylbutyl)-L-α-aspartyl]-L-phenylalanine 1-methyl ester (80 wt %), water (15 wt %) and polyvinylpyrrollidone (5 wt %) were manually mixed and kneaded. The mixture was extruded using a low pressure extruder with a 0.8 mm die (model DG-L1, LCI). The extrudates were dried in a fluid bed dryer at 50° C. The Karl Fischer moisture content, dissolution rate and hardness for these cylindrical particles with rounded edges were determined via the same methods outlined in Examples 3–7 above. Specifically, the moisture content was 5.3%, the dissolution rate was 1.5 min and the hardness was 75.3%.

EXAMPLE 9

Extruding Neotame Wetcake

Neotame wetcake containing 31.2% moisture was fed to an extruder (Extrud-O-Mix, model EM-2, single screw, axial, low pressure, Hosokawa Bepex) through the screw feeder. Wet extrudates were smooth but long and warm; some of the extrudates stuck together. They were screened manually using an 8 mesh screen to break up the larger agglomerates and then dried in a fluid bed dryer with inlet air temperature at 62° C. It was dried until the outlet air temperature rose to 52° C. No breakage of particles was observed during drying. The dried extrudates contained 2.1% moisture (tested using Karl Fischer titration). Dissolution rate was determined to be 15 minutes using the UV absorbance method described in connection with Examples 3–7. Hardness was 92.9%, as measured in the same manner as in Examples 3–7.

EXAMPLES 10–12

Extrudates Containing Neotame and Other Sweeteners

Sweetener blends were formed using extrusion. Extrudates were prepared in a manner substantially similar to Example 8, except the components employed differed as shown in Table 3. All extrudates were formed using the same extruder (Extrud-O-Mix, EM-2, Hosokawa Bepex). All extrudates were dried using STREA-1 (Aeromatic).

TABLE 3

| | wet mass composition | extrusion | drying | dissolution |
|---|---|---|---|---|
| 10 | 2.1% neotame 66.4% aspartame 2.7% HPMC* 28.8% water | smooth, very long sticky extrudates | inlet air: 62° C. outlet air max: 52° C., minimal dust | 14 minutes |
| 11 | 2.0% neotame 64.7% aspartame 33.3% water | extrudates recycled through extruder; collected extrudates formed at 49–52° C.; long sticky extrudates when warm; on cooling, quickly case-harden and become non-sticky | inlet air: 70° C. outlet air max: 57° C., minimal dust | 3 minutes |
| 12 | 2.7% neotame 43.7% aspartame 43.7% ace-K** 9.9% water | long, slightly sticky extrudates; extruded at 32° C. | inlet air: 50° C. outlet air max: 43° C., minimal dust | 3.5 minutes |

*hydroxypropylmethyl cellulose
**acesulfame-K

EXAMPLES 13–16

Extrusion of Neotame with Different Grades of Binder

Four different grades of hydroxypropylmethyl cellulose, namely Methocel K3 Premium, Methocel E3 Premium, Methocel E15 Premium and Methocel K35, all from Dow Chemical Company, were used to form extrudates as set forth in Table 4. The main difference between these grades is their viscosity in water solution. K3 and E3 have the lowest, E15 has intermediate and K35 has the highest viscosity. An EXD-60 extruder (LCI) was used for extrusion. STREA-1 fluid bed dryer (Aeromatic) was used for drying the wet extrudates.

TABLE 4

| | wet mass | extrusion | drying | dissolution | hardness |
|---|---|---|---|---|---|
| 13 | 72.2% neotame 3.6% HPMC* E3 24.2% water | very long, sticky extrudates; 1 mm diameter | inlet air: 50° C. outlet air max: 42° C. | 4.0 minutes | 94.9% |
| 14 | 74.6% neotame 3.7% HPMC K3 21.7% water | long, less sticky extrudates; 1 mm diameter | inlet air: 50° C. outlet air max: 42° C. | 2.5 minutes | 94.0% |
| 15 | 73.5% neotame 3.7% HPMC E15 LV 22.8% water | too long and sticky extrudates; 1 mm diameter | inlet air: 50° C. outlet air max: 42° C. | 7.0 minutes | 97.2% |
| 16 | 74.0% neotame 3.7% HPMC K35 22.3% water | too long and sticky extrudates | inlet air: 50° C. outlet air max: 42° C. | 8.5 minutes | 99.6% |

*hydroxypropylmethyl cellulose

Other variations and modifications of this invention will be obvious to those skilled in this art. This invention is not to be limited except as set forth in the following claims.

What is claimed is:

1. A process for forming particles of N-[(N-(3,3-dimethylbutyl)-L-α-aspartyl]-L-phenylalanine 1-methyl ester comprising the steps of:
    (a) forming a wet mass by mixing N-[N-(3,3-dimethylbutyl)-L-α-aspartyl]-L-phenylalanine 1-methyl ester and a plasticizer;
    (b) extruding said wet mass to form extrudates; and
    (c) drying said extrudates to form said particles of N-[N-(3,3-dimethylbutyl)-L-α-aspartyl]-L-phenylalanine 1-methyl ester.

2. The process according to claim 1, wherein said plasticizer is water.

3. The process according to claim 1, wherein a binder is added to said wet mass prior to said extruding step.

4. The process according to claim 3, wherein said binder is selected from the group consisting of polyvinylpyrollidone, maltodextrins, microcrystalline cellulose, starches, hydroxypropylmethyl cellulose, methylcellulose, hydroxypropyl cellulose, gum arabic, gelatin, xanthan gum and mixtures thereof.

5. The process according to claim 1, wherein said wet mass is heated to promote the binding of said wet mass prior to said extruding step.

6. The process according to claim 5, wherein said wet mass is heated to a temperature from about 30° C. to about 65° C.

7. The process according to claim 1 further comprising the step of forming spheres from said extrudates prior to said drying step.

8. The process according to claim 7, wherein said spheres are formed with a marumerizer.

9. The process according to claim 7, wherein a binder is added to said wet mass prior to said extruding step.

10. The process according to claim 9, wherein said binder is selected from the group consisting of polyvinylpyrollidone, maltodextrins, microcrystalline cellulose, starches, hydroxypropylmethyl cellulose, methylcellulose, hydroxypropyl cellulose, gum arabic, gelatin, xanthan gum and mixtures thereof.

11. The process according to claim 7, wherein said wet mass is heated to promote the binding of said wet mass prior to said extruding step.

12. The process according to claim 11, wherein said wet mass is heated to a temperature from about 30° C. to about 65° C.

13. The process according to claim 1, wherein the wet mass further comprises a carrier.

14. The process according to claim 13, wherein the carrier is selected from the group consisting of lactose, maltodextrins, dextrose, citric acid, microcrystalline cellulose, sugar, sugar alcohols and mixtures thereof.

15. The process according to claim 1, wherein the wet mass further comprises an additive.

16. The process according to claim 15, wherein the additive is selected from the group consisting of $CaCl_2$, $MgCl_2$, flavor enhancers/modifiers, acidulants and mixtures thereof.

17. The process according to claim 1, wherein the wet mass further comprises a known natural sweetener or other high intensity sweetener.

18. The process according to claim 17, wherein said known natural sweetener or other high intensity sweetener is selected from the group consisting of aspartame, acesulfame salts, sucralose, saccharin, alitame, cyclamates, stevia derivatives, thaumatin, sucrose, high fructose corn syrup, high conversion corn syrup, crystalline fructose, glucose, dextrose, polyol sugar alcohols, invert sugar and mixtures thereof.

19. A N-[N-(3,3-dimethylbutyl)-L-α-aspartyl]-L-phenylalanine 1-methyl ester composition made according to the process comprising the steps of:
    (a) forming a wet mass by mixing N-[N-(3,3-dimethylbutyl)-L-α-aspartyl]-L-phenylalanine 1-methyl ester and a plasticizer;
    (b) extruding said wet mass to form extrudates; and
    (c) drying said extrudates to form particles of N-[N-(3,3-dimethylbutyl)-L-α-aspartyl]-L-phenylalanine 1-methyl ester.

20. The N-[N-(3,3-dimethylbutyl)-L-α-aspartyl]-L-phenylalanine 1-methyl ester composition according to claim 19, wherein said plasticizer is water.

21. The N-[N-(3,3-dimethylbutyl)-L-α-aspartyl]-L-phenylalanine 1-methyl ester composition according to claim 19, wherein a binder is added to said wet mass prior to said extruding step.

22. The N-[N-(3,3-dimethylbutyl)-L-α-aspartyl]-L-phenylalanine 1-methyl ester composition according to claim 21, wherein said binder is selected from the group consisting of polyvinylpyrollidone, maltodextrins, microcrystalline cellulose, starches, hydroxypropylmethyl cellulose, methylcellulose, hydroxypropyl cellulose, gum arabic, gelatin, xanthan gum and mixtures thereof.

23. The N-[N-(3,3-dimethylbutyl)-L-α-aspartyl]-L-phenylalanine 1-methyl ester composition according to claim 19, wherein said wet mass is heated to promote the binding of said wet mass prior to said extruding step.

24. The N-[N-(3,3-dimethylbutyl)-L-α-aspartyl]-L-phenylalanine 1-methyl ester composition according to claim 23, wherein said wet mass is heated to a temperature from about 30° C. to about 65° C.

25. The N-[N-(3,3-dimethylbutyl)-L-α-aspartyl]-L-phenylalanine 1-methyl ester composition according to claim 21, wherein said binder is present in said particles of N-[N-(3,3-dimethylbutyl)-L-α-aspartyl]-L-phenylalanine 1-methyl ester in an amount from about 0.1% to about 60% by weight.

26. The N-[N-(3,3-dimethylbutyl)-L-α-aspartyl]-L-phenylalanine 1-methyl ester composition according to claim 21, wherein said N-[N-(3,3-dimethylbutyl)-L-α-aspartyl]-L-phenylalanine 1-methyl ester is present in said particles of N-[N-(3,3-dimethylbutyl)-L-α-aspartyl]-L-phenylalanine 1-methyl ester in an amount from about 25% to about 99.9% by weight.

27. The N-[N-(3,3-dimethylbutyl)-L-α-aspartyl]-L-phenylalanine 1-methyl ester composition according to claim 21, wherein said plasticizer is present in said particles of N-[N-(3,3-dimethylbutyl)-L-α-aspartyl]-L-phenylalanine 1-methyl ester in an amount from about 0% to about 15% by weight.

28. The N-[N-(3,3-dimethylbutyl)-L-α-aspartyl]-L-phenylalanine 1-methyl ester composition according to claim 23, wherein said N-[N-(3,3-dimethylbutyl)-L-α-aspartyl]-L-phenylalanine 1-methyl ester is present in said particles of N-[N-(3,3-dimethylbutyl)-L-α-aspartyl]-L-phenylalanine 1-methyl ester in an amount from about 85% to about 100% by weight.

29. The N-[N-(3,3-dimethylbutyl)-L-α-aspartyl]-L-phenylalanine 1-methyl ester composition according to claim 23, wherein said plasticizer is present in said particles of N-[N-(3,3-dimethylbutyl)-L-α-aspartyl]-L-phenylalanine 1-methyl ester in an amount from about 0% to about 15% by weight.

30. The N-[N-(3,3-dimethylbutyl)-L-α-aspartyl]-L-phenylalanine 1-methyl ester composition according to claim 19 further comprising the step of forming spheres from said extrudates prior to said drying step.

31. The N-[N-(3,3-dimethylbutyl)-L-α-aspartyl]-L-phenylalanine 1-methyl ester composition according to claim 30, wherein said spheres are formed with a marumerizer.

32. The N-[N-(3,3-dimethylbutyl)-L-α-aspartyl]-L-phenylalanine 1-methyl ester composition according to claim 30, wherein a binder is added to said wet mass prior to said extruding step.

33. The N-[N-(3,3-dimethylbutyl)-L-α-aspartyl]-L-phenylalanine 1-methyl ester composition according to claim 32, wherein said binder is selected from the group consisting of polyvinylpyrollidone, maltodextrins, microcrystalline cellulose, starches, hydroxypropylmethyl cellulose, methylcellulose, hydroxypropyl cellulose, gum arabic, gelatin, xanthan gum and mixtures thereof.

34. The N-[N-(3,3-dimethylbutyl)-L-α-aspartyl]-L-phenylalanine 1-methyl ester composition according to claim 30, wherein said wet mass is heated to promote the binding of said wet mass prior to said extruding step.

35. The N-[N-(3,3-dimethylbutyl)-L-α-aspartyl]-L-phenylalanine 1-methyl ester composition according to claim 34, wherein said wet mass is heated to a temperature from about 30° C. to about 65° C.

36. The N-[N-(3,3-dimethylbutyl)-L-α-aspartyl]-L-phenylalanine 1-methyl ester composition according to claim 32, wherein said binder is present in said particles of N-[N-(3,3-dimethylbutyl)-L-α-aspartyl]-L-phenylalanine 1-methyl ester in an amount from about 0.1% to about 60% by weight.

37. The N-[N-(3,3-dimethylbutyl)-L-α-aspartyl]-L-phenylalanine 1-methyl ester composition according to claim 32, wherein said N-[N-(3,3-dimethylbutyl)-L-α-aspartyl]-L-phenylalanine 1-methyl ester is present in said particles of N-[N-(3,3-dimethylbutyl)-L-α-aspartyl]-L-phenylalanine 1-methyl ester in an amount from about 25% to about 99.9% by weight.

38. The N-[N-(3,3-dimethylbutyl)-L-α-aspartyl]-L-phenylalanine 1-methyl ester composition according to claim 32, wherein said plasticizer is present in said particles of N-[N-(3,3-dimethylbutyl)-L-α-aspartyl]-L-phenylalanine 1-methyl ester in an amount from about 0% to about 15% by weight.

39. The N-[N-(3,3-dimethylbutyl )-L-α-aspartyl]-L-phenylalanine 1-methyl ester composition according to claim 34, wherein said N-[N-(3,3-dimethylbutyl)-L-α-aspartyl]-L-phenylalanine 1-methyl ester is present in said particles of N-[N-(3,3-dimethylbutyl)-L-α-aspartyl]-L-phenylalanine 1-methyl ester in an amount from about 85% to about 100% by weight.

40. The N-[N-(3,3-dimethylbutyl)-L-α-aspartyl]-L-phenylalanine 1-methyl ester composition according to claim 34, wherein said plasticizer is present in said particles of N-[N-(3,3-dimethylbutyl)-L-α-aspartyl]-L-phenylalanine 1-methyl ester in an amount from about 0% to about 15% by weight.

41. The N-[N-(3,3-dimethylbutyl)-L-α-aspartyl]-L-phenylalanine 1-methyl ester composition according to claim 19, wherein the wet mass further comprises a carrier.

42. The N-[N-(3,3-dimethylbutyl)-L-α-aspartyl]-L-phenylalanine 1-methyl ester composition according to claim 41, wherein the carrier is selected from the group consisting of lactose, maltodextrins, dextrose, citric acid, microcrystalline cellulose, sugar, sugar alcohols and mixtures thereof.

43. The N-[N-(3,3-dimethylbutyl)-L-α-aspartyl]-L-phenylalanine 1-methyl ester composition according to claim 19, wherein the wet mass further comprises an additive.

44. The N-[N-(3,3-dimethylbutyl)-L-α-aspartyl]-L-phenylalanine 1-methyl ester composition according to claim 43, wherein the additive is selected from the group consisting of $CaCl_2$, $MgCl_2$, flavor enhancers/modifiers, acidulants and mixtures thereof.

45. The N-[N-(3,3-dimethylbutyl)-L-α-aspartyl]-L-phenylalanine 1-methyl ester composition according to claim 19, wherein the wet mass further comprises a known natural sweetener or other high intensity sweetener.

46. The N-[N-(3,3-dimethylbutyl)-L-α-aspartyl]-L-phenylalanine 1-methyl ester composition according to claim 45, wherein said known natural sweetener or other high intensity sweetener is selected from the group consisting of aspartame, acesulfame salts, sucralose, saccharin, alitame, cyclamates, stevia derivatives, thaumatin, sucrose, high fructose corn syrup, high conversion corn syrup, crystalline fructose, glucose, dextrose, polyol sugar alcohols, invert sugar and mixtures thereof.

47. The N-[N-(3,3-dimethylbutyl)-L-α-aspartyl]-L-phenylalanine 1-methyl ester composition according to claim 19, wherein said particles of N-[N-(3,3-dimethylbutyl)-L-α-aspartyl]-L-phenylalanine 1-methyl ester composition have a particle size from about 10 to about 140 mesh.

48. A method of sweetening a food by including in said food a N-[N-(3,3-dimethylbutyl)-L-α-aspartyl]-L-phenylalanine 1-methyl ester composition according to claim 19 in an amount effective to sweeten said food.

49. The method according to claim 48, wherein said food is selected from the group consisting of beverages, fluid dairy products, condiments, baked goods, frostings, bakery fillings, candy and chewing gum.

50. A method of preparing a table-top sweetener by including in said table-top sweetener a N-[N-(3,3-dimethylbutyl)-L-α-aspartyl]-L-phenylalanine 1-methyl ester composition according to claim 19 in an amount effective to sweeten said table-top sweetener.

51. A sweetened food comprising a N-[N-(3,3-dimethylbutyl)-L-α-aspartyl]-L-phenylalanine 1-methyl ester composition according to claim 19 in an amount effective to sweeten the food.

52. The sweetened food according to claim 51, wherein said food is selected from the group consisting of beverages, fluid dairy products, condiments, baked goods, frostings, bakery fillings, candy and chewing gum.

53. A table-top sweetener comprising a N-[N-(3,3-dimethylbutyl)-L-α-aspartyl]-L-phenylalanine 1-methyl ester composition according to claim 19 in an amount effective to sweeten said table-top sweetener.

54. A method of sweetening a food by including in said food a N-[N-(3,3-dimethylbutyl)-L-α-aspartyl]-L-phenylalanine 1-methyl ester composition according to claim 30 in an amount effective to sweeten said food.

55. The method according to claim 54, wherein said food is selected from the group consisting of beverages, fluid dairy products, condiments, baked goods, frostings, bakery fillings, candy and chewing gum.

56. A method of preparing a table-top sweetener by including in said table-top sweetener a N-[N-(3,3-dimethylbutyl)-L-α-aspartyl]-L-phenylalanine 1-methyl ester composition according to claim 30 in an amount effective to sweeten said table-top sweetener.

57. A sweetened food comprising a N-[N-(3,3-dimethylbutyl)-L-α-aspartyl]-L-phenylalanine 1-methyl ester composition according to claim 30 in an amount effective to sweeten the food.

58. The sweetened food according to claim 57, wherein said food is selected from the group consisting of beverages, fluid dairy products, condiments, baked goods, frostings, bakery fillings, candy and chewing gum.

59. A table-top sweetener comprising a N-[N-(3,3-dimethylbutyl)-L-α-aspartyl]-L-phenylalanine 1-methyl ester composition according to claim 30 in an amount effective to sweeten said table-top sweetener.

60. A process for forming particles of N-[N-(3,3-dimethylbutyl)-L-α-aspartyl]-L-phenylalanine 1-methyl ester comprising the steps of:
    (a) extruding neotame wetcake to form extrudates; and
    (b) drying said extrudates to form said particles of N-[N-(3,3-dimethylbutyl)-L-α-aspartyl]-L-phenylalanine 1-methyl ester.

61. The process according to claim 60, wherein said wetcake is heated to promote the binding of said wetcake prior to said extruding step.

62. The process according to claim 61, wherein said wetcake is heated to a temperature from about 30° C. to about 65° C.

63. The process according to claim 60 further comprising the step of forming spheres from said extrudates prior to said drying step.

64. The process according to claim 63, wherein said spheres are formed with a marumerizer.

65. The process according to claim 63, wherein said wetcake is heated to promote the binding of said wetcake prior to said extruding step.

66. The process according to claim 65, wherein said wet mass is heated to a temperature from about 30° C. to about 65° C.

67. A N-[N-(3,3-dimethylbutyl)-L-α-aspartyl]-L-phenylalanine 1-methyl ester composition made according to the process comprising the steps of:
    (a) extruding neotame wetcake to form extrudates; and
    (b) drying said extrudates to form particles of N-[N-(3,3-dimethylbutyl)-L-α-aspartyl]-L-phenylalanine 1-methyl ester.

68. The N-[N-(3,3-dimethylbutyl)-L-α-aspartyl]-L-phenylalanine 1-methyl ester composition according to claim 67, wherein said wetcake is heated to promote the binding of said wetcake prior to said extruding step.

69. The N-[N-(3,3-dimethylbutyl)-L-α-aspartyl]-L-phenylalanine 1-methyl ester composition according to claim 68, wherein said wetcake is heated to a temperature from about 30° C. to about 65° C.

70. The N-[N-(3,3-dimethylbutyl)-L-α-aspartyl]-L-phenylalanine 1-methyl ester composition according to claim 67, wherein said N-[N-(3,3-dimethylbutyl)-L-α-aspartyl]-L-phenylalanine 1-methyl ester is present in said particles of N-[N-(3,3-dimethylbutyl)-L-α-aspartyl]-L-phenylalanine 1-methyl ester in an amount from about 85% to about 100% by weight.

71. The N-[N-(3,3-dimethylbutyl)-L-α-aspartyl]-L-phenylalanine 1-methyl ester composition according to claim 67, wherein water is present in said particles of N-[N-(3,3-dimethylbutyl)-L-α-aspartyl]-L-phenylalanine 1-methyl ester in an amount from about 0% to about 15% by weight.

72. The N-[N-(3,3-dimethylbutyl)-L-α-aspartyl]-L-phenylalanine 1-methyl ester composition according to claim 67 further comprising the step of forming spheres from said extrudates prior to said drying step.

73. The N-[N-(3,3-dimethylbutyl)-L-α-aspartyl]-L-phenylalanine 1-methyl ester composition according to claim 72, wherein said spheres are formed with a marumerizer.

74. The N-[N-(3,3-dimethylbutyl)-L-α-aspartyl]-L-phenylalanine 1-methyl ester composition according to claim 72, wherein said wetcake is heated to promote the binding of said wetcake prior to said extruding step.

75. The N-[N-(3,3-dimethylbutyl)-L-α-aspartyl]-L-phenylalanine 1-methyl ester composition according to claim 74, wherein said wetcake is heated to a temperature from about 30° C. to about 65° C.

76. The N-[N-(3,3-dimethylbutyl)-L-α-aspartyl]-L-phenylalanine 1-methyl ester composition according to claim 72, wherein said N-[N-(3,3-dimethylbutyl)-L-α-aspartyl]-L-phenylalanine 1-methyl ester is present in said particles of N-[N-(3,3-dimethylbutyl)-L-α-aspartyl]-L-phenylalanine 1-methyl ester in an amount from about 85% to about 100% by weight.

77. The N-[N-(3,3-dimethylbutyl)-L-α-aspartyl]-L-phenylalanine 1-methyl ester composition according to claim 72, wherein water is present in said particles of N-[N-(3,3-dimethylbutyl)-L-α-aspartyl]-L-phenylalanine 1-methyl ester in an amount from about 0% to about 15% by weight.

78. The N-[N-(3,3-dimethylbutyl)-L-α-aspartyl]-L-phenylalanine 1-methyl ester composition according to claim 67, wherein said particles of N-[N-(3,3-dimethylbutyl)-L-α-aspartyl]-L-phenylalanine 1-methyl ester composition have a particle size from about 10 to about 140 mesh.

79. A method of sweetening a food by including in said food a N-[N-(3,3-dimethylbutyl)-L-α-aspartyl]-L-phenylalanine 1-methyl ester composition according to claim 67 in an amount effective to sweeten said food.

80. The method according to claim 79, wherein said food is selected from the group consisting of beverages, fluid dairy products, condiments, baked goods, frostings, bakery fillings, candy and chewing gum.

81. A method of preparing a table-top sweetener by including in said table-top sweetener a N-[N-(3,3-dimethylbutyl)-L-α-aspartyl]-L-phenylalanine 1-methyl ester composition according to claim 67 in an amount effective to sweeten said table-top sweetener.

82. A sweetened food comprising a N-[N-(3,3-dimethylbutyl)-L-α-aspartyl]-L-phenylalanine 1-methyl ester composition according to claim 67 in an amount effective to sweeten the food.

83. The sweetened food according to claim 82, wherein said food is selected from the group consisting of beverages, fluid dairy products, condiments, baked goods, frostings, bakery fillings, candy and chewing gum.

84. A table-top sweetener comprising a N-[N-(3,3-dimethylbutyl)-L-α-aspartyl]-L-phenylalanine 1-methyl ester composition according to claim 67 in an amount effective to sweeten said table-top sweetener.

85. A method of sweetening a food by including in said food a N-[N-(3,3-dimethylbutyl)-L-α-aspartyl]-L-phenylalanine 1-methyl ester composition according to claim 72 in an amount effective to sweeten said food.

86. The method according to claim 85, wherein said food is selected from the group consisting of beverages, fluid dairy products, condiments, baked goods, frostings, bakery fillings, candy and chewing gum.

87. A method of preparing a table-top sweetener by including in said table-top sweetener a N-[N-(3,3-dimethylbutyl)-L-α-aspartyl]-L-phenylalanine 1-methyl ester composition according to claim 72 in an amount effective to sweeten said table-top sweetener.

88. A sweetened food comprising a N-[N-(3,3-dimethylbutyl)-L-α-aspartyl]-L-phenylalanine 1-methyl ester composition according to claim 72 in an amount effective to sweeten the food.

89. The sweetened food according to claim 88, wherein said food is selected from the group consisting of beverages, fluid dairy products, condiments, baked goods, frostings, bakery fillings, candy and chewing gum.

90. A table-top sweetener comprising a N-[N-(3,3-dimethylbutyl)-L-α-aspartyl]-L-phenylalanine 1-methyl ester composition according to claim 72 in an amount effective to sweeten said table-top sweetener.

\* \* \* \* \*